April 5, 1955 F. WALLER 2,705,439
SLIDE PROJECTOR WITH SLOPING MAGAZINE AND SLIDE CARRIER
FOR WITHDRAWING THE LOWERMOST SLIDE FROM THE MAGAZINE
Filed Feb. 20, 1951 5 Sheets-Sheet 2
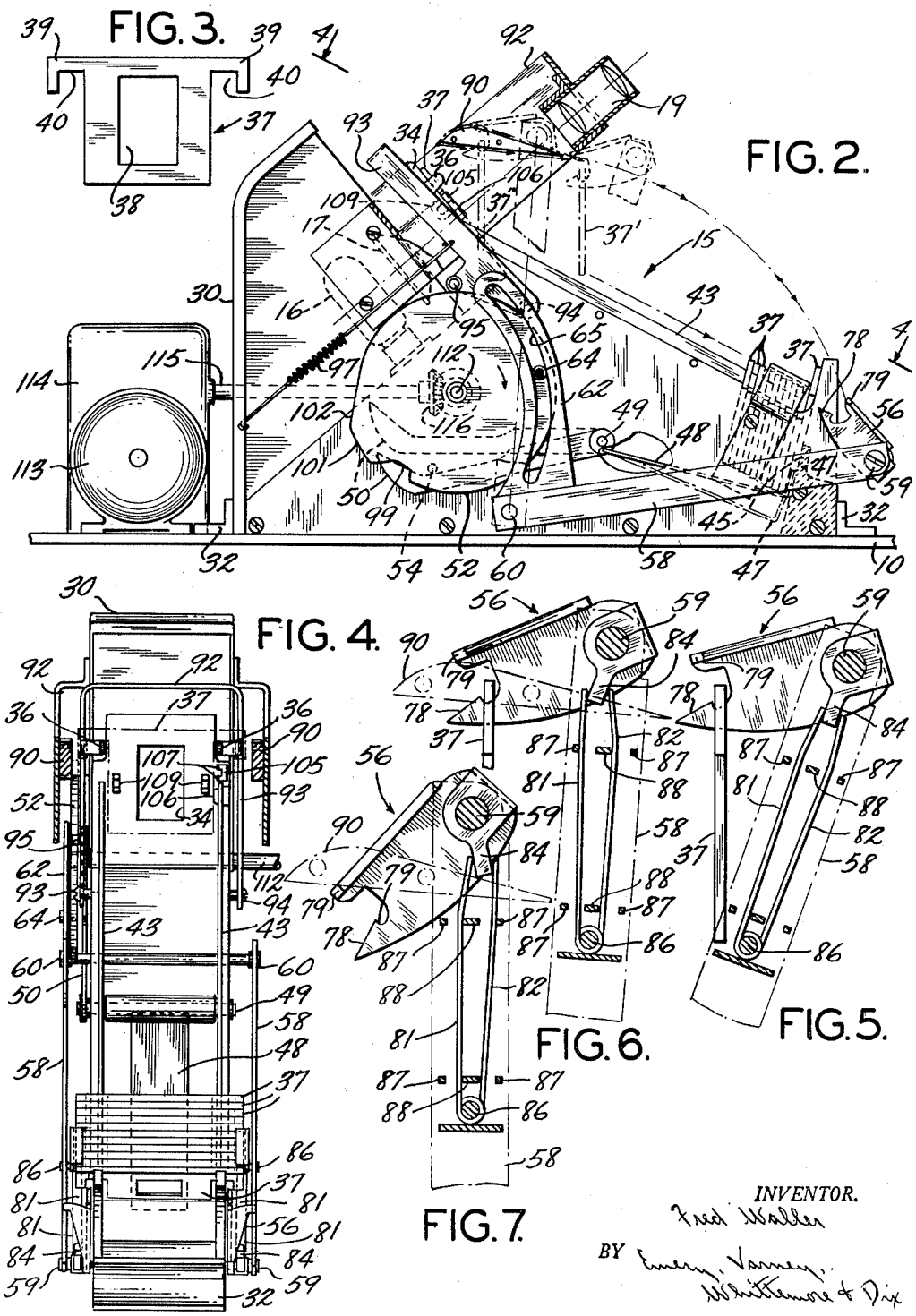
INVENTOR.
Fred Waller
BY Emery, Varney,
Whittemore & Dix
ATTORNEYS

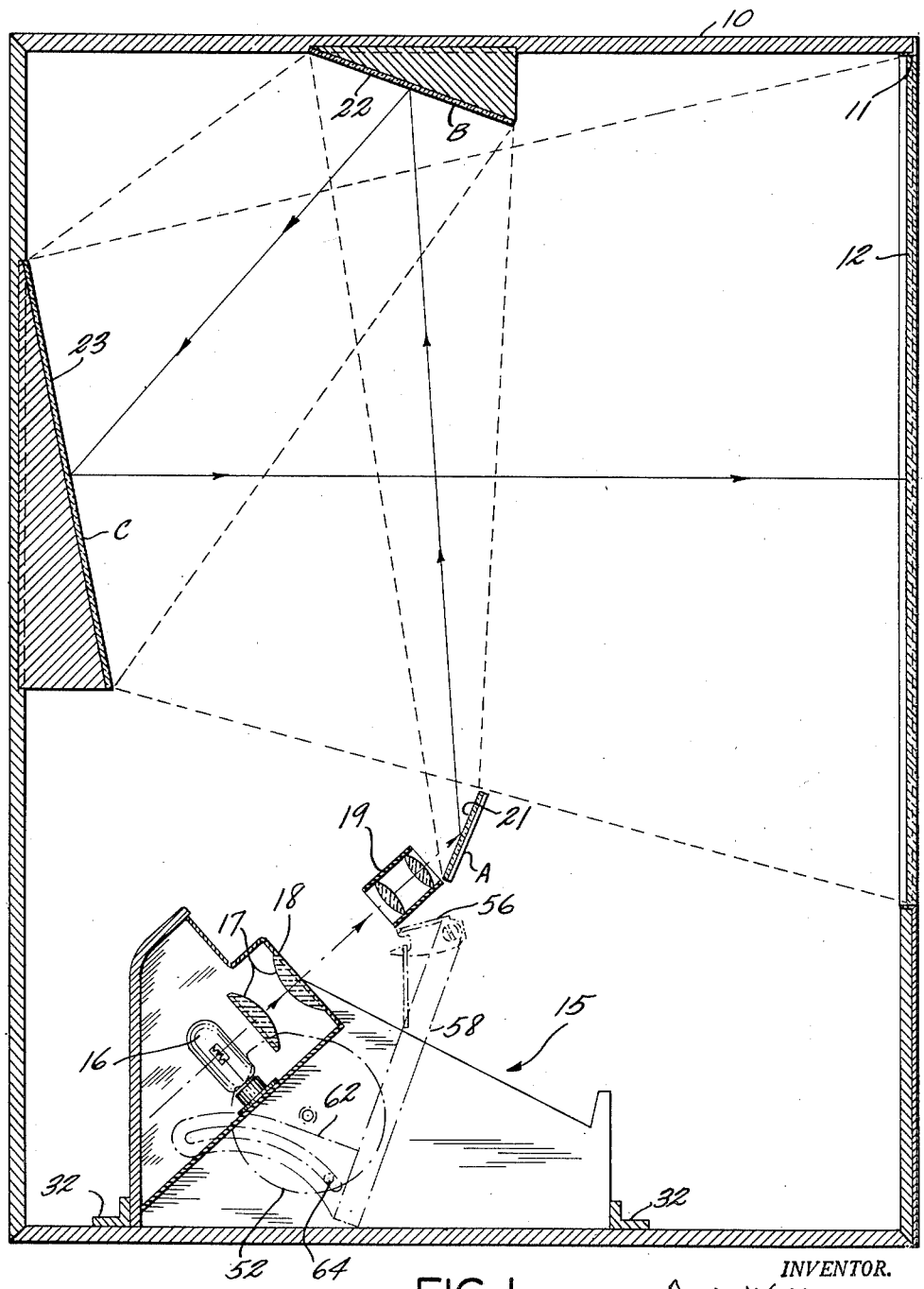
FIG. I.

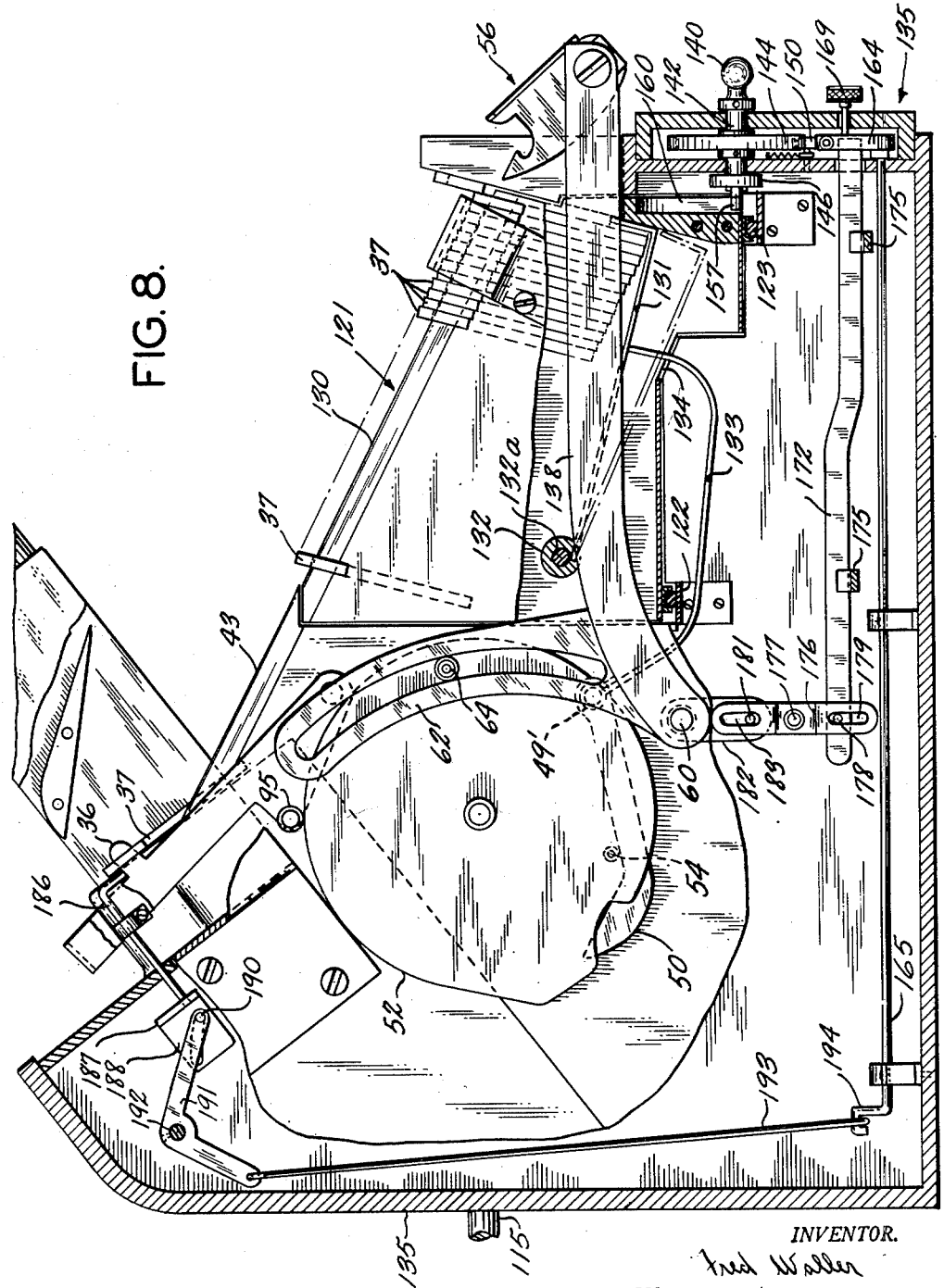

United States Patent Office

2,705,439
Patented Apr. 5, 1955

2,705,439

SLIDE PROJECTOR WITH SLOPING MAGAZINE AND SLIDE CARRIER FOR WITHDRAWING THE LOWERMOST SLIDE FROM THE MAGAZINE

Fred Waller, Huntington, N. Y., assignor to The Vitarama Corporation, Huntington Station, N. Y., a corporation of New York Application February 20, 1951, Serial No. 211,816

19 Claims. (Cl. 88—28)

This invention relates to slide projectors of the type in which successive slides are moved from a magazine into position at a projection station without interrupting the light beam that projects the slides. In such projectors, the new slide is moved into the light beam before the other slide is withdrawn and the slide at the projection station moves away as the new slide moves into the focal plane.

One object of this invention is to provide a projector with improved apparatus for bringing new slides into focus without shifting the projected image up or down as it comes into focus. A more pleasing effect is produced if the center of the illuminated area on the screen remains at a substantially fixed location and the only movement of the lighted area is the necessary change in size which occurs as the new slide comes into focus. With this invention, the limited change in illuminated areas that does occur is substantially symmetrical and the images do not shift their position on the screen as they become more sharply focused.

Another object of the invention is to provide improved slide changing mechanism which will operate on thinner slide holders so that the magazine can be smaller for any selected number of slides, and the entire projector apparatus can be more compact. This advantage is of particular significance in connection with the use of the slide projector for advertising on a store counter, or for use in other locations where space is limited.

Another feature of the invention relates to the registering of the slides with the light aperture at the projection station. The invention insures the accurate positioning of the slides with respect to the light aperture, and in the preferred construction combines such registering apparatus with means for also urging the slide holder into the focal plane of the projector after the slide holder has been released by the carrier that brings it to the projection station.

Another object of the invention is to provide a slide projector of the character indicated with one or more removable magazines so that a magazine of slides relating to one subject can be taken out of the projector and replaced by a magazine filled with a different group of slides. In the preferred construction, the apparatus has a support on which a number of different magazines can be placed, and there is a handle for shifting the magazines as a unit to bring any selected magazine into operative position with respect to the slide holder carrier.

Some features of the invention relate to interferences or locks that prevent movement of the magazines before a slide holder at the projection station has been returned to its magazine or while the holder carrier is transporting the slide from a magazine to the projection station. These features prevent the movement of the magazine until any slides that were taken from it have been returned.

Other objects, features and advantages of the invention will appear or be pointed out as the description proceeds.

In the drawing, forming a part hereof, in which like reference characters indicate corresponding parts in all the views, Fig. 1 is a diagrammatic sectional view through a slide projector embodying this invention.

Fig. 2 is an enlarged side elevation of the projector and slide changing mechanism illustrated in Fig. 1, Fig. 3 is a view, on an enlarged scale, showing one of the slide holders used with the projector of this invention, Fig. 4 is a view looking down on the projector of Fig. 2 from the plane 4—4 of Fig. 2, Figs. 5, 6 and 7 are detail views showing the operation of the slide holder carrier hooks at different positions during the cycle of operation of the slide holder carrier.

Fig. 8 is an enlarged view, similar to Figure 2, but showing a modified form of the invention.

Figure 9:
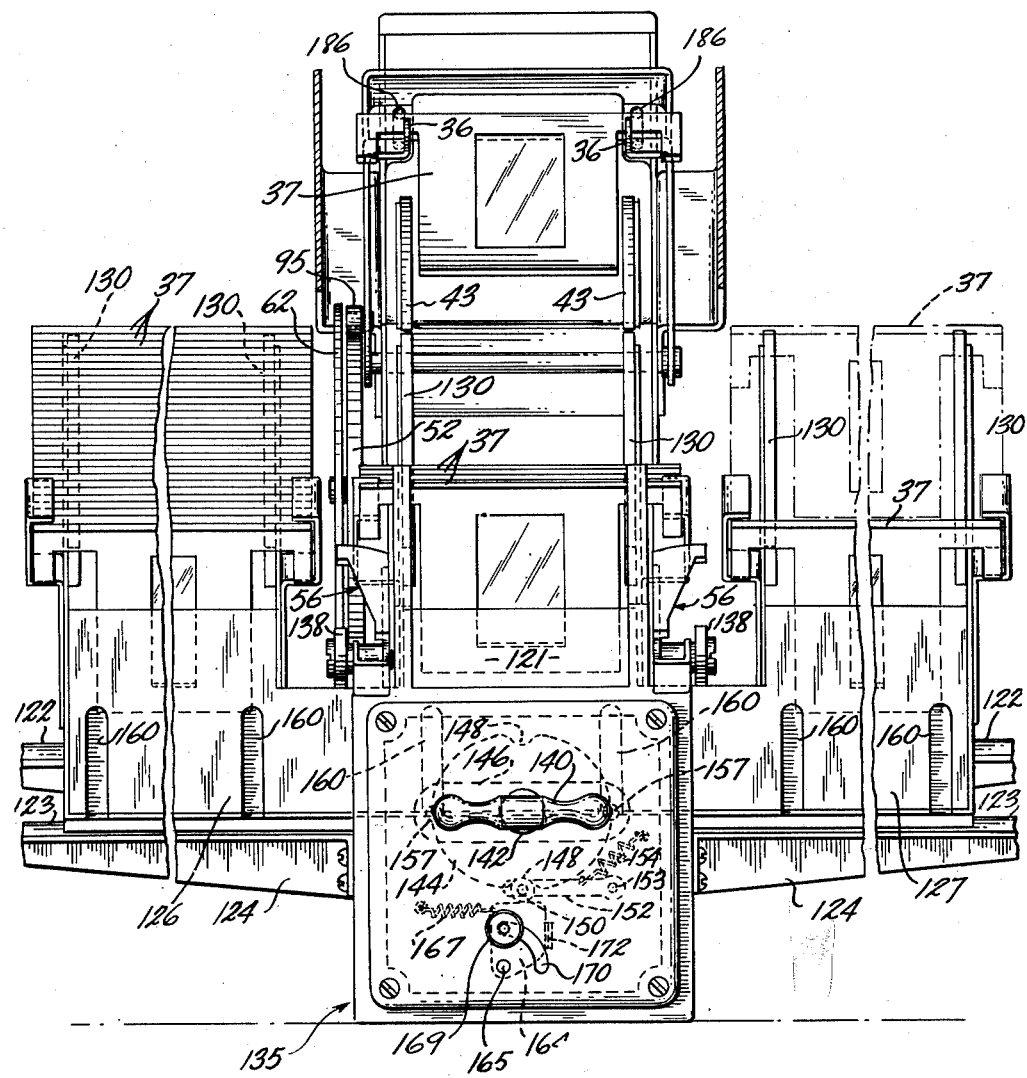
Fig. 9 is a front view of the modified apparatus shown in Figure 8.

The apparatus shown in Fig. 1 includes a housing 10 having a front opening 11 in which there is a translucent screen 12, consisting of a ground glass or other suitable material. On the bottom of the housing 10 there is a projector 15 including a lamp 16, condenser lenses 17, a projection station 18, and a lens 19 which is adjustable toward and from the projection station to focus the projector.

A mirror 21 is located ahead of the lens 19 and set at such an angle that it directs the light beam from the projector upward to a second and larger mirror 22 at the top of the housing. This second mirror 22 is set at an angle to direct the light beam downwardly and rearwardly to a third mirror 23 which throws the light beam forward to the screen 12. The lens 19 is adjusted to focus the image on the screen 12. The mirrors 21, 22 and 23 increase in size in accordance with the widening of the light beam and they are arranged so that the light beam reflections from all of the mirrors pass mostly through the same space within the housing 10 and obtain a long focal length with a housing of minimum size.

Fig. 2 shows the construction of the projector. It has a frame 30 which is connected with the bottom of the housing 10 by fastening elements 32 to accurately position the projector in the housing. At the projection station 18 there is an aperture plate 34 through which the light beam from the lamp 16 shines. This aperture plate 34 slopes downwardly; and, in the construction shown, makes an angle of approximately 45° with the horizontal. There are registration pins or supports 36 at opposite sides of the aperture plate for supporting a slide holder 37 in position to project the slide carried by the holder.

Fig. 3 shows one of the slide holders 37. The slide holder has a frame in which a slide 38 is mounted, and there are horns 39 extending from opposite sides of the frame 30 at the top of the slide holder. Each of these horns 39 has a recess 40 in its bottom edge which enables the horns to hook over guide rails from which the slide holders hang in the magazine of the projector.

The projector magazine for holding a plurality of lantern slide holders 37 includes two guide rails 43 sloping downwardly from the projection station in parallel relation with one another and spaced far enough apart to permit the slide holders to hang down between them.

The guide rails 43 are steep enough for the slide holders to slide downwardly along the rails into the positions shown in Fig. 2. The lowermost slide holder in the magazine contacts with an abutment plate 45 which is a rigid part of the projector frame. The aperture plate 34 is at a steeper angle than the guide rails 43 so that slide holders released from the projection station will drop out of the light beam quickly and then slide further downward along the guide rails 43 where the speed of movement is not important. The guide rails 43 are generally in line with the registration pins 36 so that both the registration pins and the guide rails on each side of the projector engage the recess 40 on the corresponding side of the slide holder, but exact alinement is unnecessary because the recesses 40 are made wide enough to allow for some variation and for reasonably wide manufacturing tolerances.

In order to make it possible to use thin slide holders with a simple carrier for moving the lowermost slide holder from the magazine to the projection station, mechanism is provided for periodically thrusting the lowermost slide holder part-way out of the magazine and into the path of the carrier. This mechanism includes a movable element comprising a pusher 47 located immediately under the lowermost slide holder in the magazine. This pusher 47 is connected to the lower end of a lever 48 which is secured to a fulcrum shaft 49. This fulcrum shaft 49 extends beyond the front of the frame 30 and has a crank 50 secured to it in position to extend between the frame 30 and a cam 52 that is spaced a short distance in front of the frame 30.

A pin 54 extending from the rearward face of the cam 52 displaces the crank 50 during a certain portion of the angular movement of the cam 52. This displacement rocks the fulcrum shaft 49 and lifts the lever 48 and pusher 47 into the full line position shown in Fig. 2. This movement of the pusher 47 lifts the endmost slide holder 37 part-way out of the magazine so that the horns 39 of the slide holder are in the path of movement of the slide carrier.

The slide carrier includes a swivel 56 on each side of the projector. Each of these swivels 56 is connected with a carrier arm 58 by a pivot screw 59, and each carrier arm 58 oscillates about the axis of a pin 60 extending from the frame of the projector. The carrier arms 58 are both secured to the shaft 60 which extends through the frame of the projector. This shaft 60 which connects the carrier arms is a part of the slide holder carrier and it makes it possible to operate both of the carrier arms in unison from a single cam.

The carrier arm 58 at the front of the projector is secured to an upwardly extending lever having a slotted portion 62 beyond the pin 60 and this slotted portion 62 of the lever extends across the front of the cam 52. A stud 64 protrudes from the front face of the cam 52 into a curved slot 65 which extends throughout most of the length of the slotted portion 62. This slot 65 is shaped to give the carrier arm 58 the desired velocity of angular movement during different periods in each complete rotation of the cam 52. The operation is a quick-return motion, which brings the carrier arms upward at a moderate speed while they are moving the slide holders, and then returns the carrier arms to their starting position swiftly after the slide holder has been left at the projection station.

Each of the swivels 56 includes a hook 78 that engages the slide holders and includes also a cam follower 79 extending forward toward the reader from the swivel 56 shown in Fig. 2 and rearwardly from the corresponding swivel on the other side of the projector. The purpose of the cam follower 79 on each swivel is to rock the swivel about the pivot screw 59 during part of the cycle of operation of the projector as will be more fully explained.

The neutral angular position of each swivel 56 with respect to its carrier arm 58 is determined by springs 81 and 82 at the back of the carrier arm 58. These springs contact with opposite sides of a downwardly extending tail piece 84 of the swivel 56, and when both of the springs 81 and 82 exert equal pressure against the opposite sides of the tail piece 84, the swivel 56 is in its neutral position.

The springs 81 and 82 are shown as opposite ends of a common spring element which is connected to the carrier arm 58 by a fastening 86. There are preferably limit stops 87 and 88 extending back from each carrier arm 58 in position to limit the flexing of the springs 81 and 82 of that carrier arm.

Figs. 5, 6 and 7 show one of the swivels 56 in its neutral, raised and lowered positions, respectively, and illustrate the way in which the springs 81 and 82 flex to permit movement of the swivel 56 either upwardly or downwardly from its neutral position as the arms 58 move upwardly and particularly as the cam follower 79 travels around the cam 90.

As the carrier arms 58 start moving upward (Fig. 2), they bring the hooks 78 under the horns of the lowermost slide holder 37 and lift the slide holder out of the magazine. The hooks may be pulled downward by the resistance offered by the slide holder and this provides some resilience for the hooks 78 as they pull each slide out of the magazine but this movement of the hooks and rocking of the swivels 56 with respect to the carrier arm 58 is more or less incidental and is not the reason for providing angular movement of the hooks with respect to the carrier arms.

Continued upward movement of the carrier arms 58 moves the slide holder along an arc and into the position indicated in dotted lines and designated by the reference character 37'. At this location the slide holder begins to move into the light beam of the projector. As the carrier arms 58 continue to move upward, the slide holder is moved into the position indicated by dotted lines and designated by the reference character 37''. In this position the new slide has obstructed the light beam and the image of the slide is seen on the screen but very much out of focus because the moving slide holder is still a substantial distance ahead of the focal plane of the projector.

During the movement of the new slide across the light beam and into position at the projection station, the cam follower 79 of the slide holder carrier contacts with the upper surface of cams 90 carried on a fixed bracket 92 which supports the lens 19. The sides of this bracket 92 are spaced apart widely enough to permit the carrier arms 58 to enter the space between the sides of the bracket, but the cam elements 90 are in the path of the cam followers 79 which extend in opposite directions from the swivels 56.

The upper surfaces of the cam elements 90 are so shaped that as soon as the center of the slide reaches the optical axes of the lens 19, the hooks 78 follow a path which maintains the center of the slide on the optical axis of the lens. This mode of operation causes the projected image on the screen to change in area symmetrically about the middle of the illuminated area as the slide comes into focus and prevents shifting of the image on the screen while the slide is coming into focus.

As the carrier arms 58 reach the upper limit of their movement, the cam followers 79 reach portions of the cams 90 having downwardly sloping surfaces which permit the hooks 78 of the slide holder carrier to return to their neutral positions. With the carrier arms 56 elevated and sloping toward the projection station, the neutral positions of the hooks 78 puts them at such steep downwardly extending slopes that the slide holder slips off the hooks and into contact with the aperture plate 34 at the projection station.

In order to remove each slide 37 from the projection station in time to leave the aperture plate clear for another slide, the registration pins 36 are connected with a bracket 93 that swings about a pivot 94 on the projector frame; and this bracket 93 has a cam follower 95 that rides on the peripheral surface of the cam 52.

A tension spring 97 urges the bracket 93 to rock counterclockwise about its pivot 94, but the cam 52 prevents such movement and holds the registration pins 36 in such positions that they project beyond the aperture plate 34 at all times except when a recess 99 in the cam face comes under the cam follower 95. This recess 99 is so located with respect to the pins 54 and 64 of the cam that the registration pins 36 are pulled back and the slide 37 permitted to drop downwardly away from the projection station just before the new slide holder 37 reaches the projection station. However, the registration pins 36 are not withdrawn until after the new slide has moved across the light beam. This prevents the disappearance of slide images from the screen during the time of change from one slide to the next.

The peripheral surface of the cam 52 has a raised portion 101 just beyond the recess 99 so that the registration pins 36 are thrust further out beyond the aperture plate than their normal positions first, before the slide holder slips off the carrier hooks and into contact with the registration pins 36. As the rearward slope 102 of the cam rise 101 passes under the cam follower 95, the registration pins 36 retreat slowly and bring the slide holder 37 into intimate contact with the aperture plate if the slide holder did not contact the aperture plate adequately when initially dropped down on the registration pins 36. If the slide holder is already in intimate contact with the aperture plate 34, this retreating movement of the registration pins 36 merely causes them to slip along the surfaces of the slide holder horns with which they contact.

Each slide holder remains at the projection station during the time that the carrier arms 58 are moving back to their starting position and during the additional time that the carrier arms are bringing a new slide upward into position across the light beam of the projector.

Fig. 4 shows a magnet 105 located at one side of the opening in the aperture plate 34. This magnet attracts the slide holder 37 and moves the right-hand edge of the slide holder into contact with an abutment 106. This positions the slide holder in registration with the opening in the aperture plate. It is preferable not to have the slide holder contact with the pole face of the magnet 105. The abutment 106 stops the slide holder before it strikes the pole face of the magnet, but the pole face is covered with a non-magnetic facing 107 and this facing 107 can be used in place of the abutment 106, if desired.

In the preferred construction there are other magnets 109 in position to attract the slide holder toward the aperture plate and to maintain the slide holder firmly against the plate and in the focal plane of the projector. If these magnets 109 are made sufficiently strong, the feature of having the registration pins retreat, to insure intimate contact of the slide holder with the aperture plate, can be dispensed with. The slide holder 37 is heavy enough to drop away from the projection station in spite of the attraction of the magnets 105 and 109. These magnets can be either permanent magnets or electro magnets.

The cam 52 is secured to a shaft 112 and turns as a unit with this shaft. The shaft is driven from a motor 113 through a speed reduction unit 114, shaft 115 and gears 116. This motor and driving mechanism is merely representative of power operating mechanism for the cam shaft 112, and the showing is diagrammatic.

Fig. 8 shows a modified form of the invention. Parts of this modified construction, which are similar to the structure shown in Figures 2 to 7, are indicated by the same reference characters as in those figures even where slightly changed in position. The outstanding difference between the machine in Fig. 8 and the construction shown in Figs. 2 to 7 is that the modified machine has a number of replaceable magazines. Fig. 8 shows a magazine 121 which rests on supports 122 and 123. These supports extend transversely across the full width of the main frame and across brackets 124 (Fig. 9) extending from opposite sides of the main frame.

Fig. 9 shows the magazine 121 in operative position in the machine, and shows two other magazines 126 and 127 located on either side of the center magazine 121. Each of the magazines has two rails or guideways 130 which form continuations of the guide rails 43 when the magazine is located in alignment with the guide rails 43. The magazine 126 is shown with its guideways 130 filled with slide holders 37. The magazine 121 is shown with only two slide holders 31 in it so as to expose the rails or guideways 130. The magazine 127 is shown with the lowermost slide holder 37 in full lines and the uppermost slide holder in dot-and-dash lines. Other slide holders between these positions, as in the magazine 126, are indicated by dotted lines along the edges of the group of slide holders.

Figure 10:
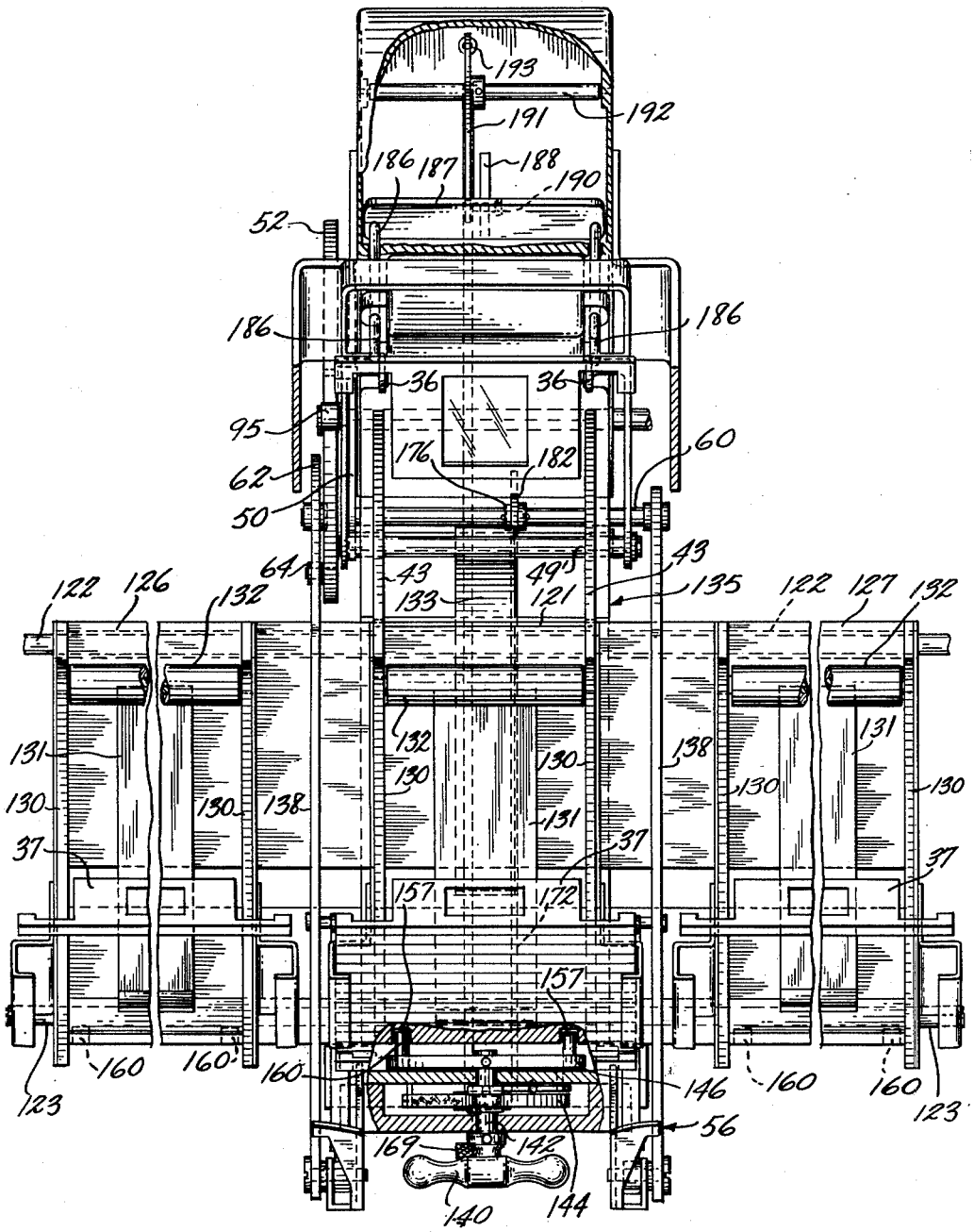
Fig. 10 is a top plan view, partly broken away and partly in section, of the apparatus shown in Figs. 8 and 9.

With the multi-magazine construction of Figures 8 to 10, it is more practical for each of the magazines to have its own pusher for lifting the lowermost slide into position to be picked up by the swivels 56 of the slide holder carrier. Each magazine has a pusher 131 which corresponds in function to the pusher 48 of Figure 2. However, each of the pushers 131 is connected with a hub 132 that is angularly movable on a fulcrum shaft 132a.

An actuator 133 is supported from the shaft 49 and extends through a slot 134 into a position below the pusher 131. This slot 134 extends across all of the magazines so that the actuator 133 lifts the pusher 131 of any magazine which may be located in alignment with the guideway 43 and immediately above the actuator 133.

Referring again to Fig. 8, the apparatus has a frame 135 which is generally similar to, but somewhat higher than the frame of the machine shown in Figure 2, and the slide holder carrier has arms 138 which operate in the same way as the arms 58 in Fig. 2, but the arms 138 have a somewhat different shape in order to provide a clearance for the supporting surface 122 on which the slide holder magazines are movable.

The apparatus shown in Fig. 8 has certain additional features which are provided because of the interchangeable magazines. These features include a manually-operated device 140 for shifting one magazine out of position and another one into position for co-operation with the slide holder carriage; and include also interferences that prevent the shifting of the magazines while the slide holder carrier 138 is moving a slide from a magazine to the projection station, or before a slide at the projection station has been returned to its magazine.

Describing first the manually-operated mechanism for shifting the magazines, the handle device 140 is secured to a shaft 142 which turns in bearings at the front of the frame 135. There is a cam 144 secured to the shaft 142, and a double crank 146 is secured to the inner end of this same shaft 142.

The cam 144 has two depressions 148 (Fig. 9) at opposite locations around its peripheral edge, and there is a cam follower 150 which moves into one or the other of these depressions 148 at each half revolution of the cam 144. The cam follower 150 is carried at one end of an arm 152 which swings about a pivot 153. A tension spring 154 pulls upward on the arm 152 and constantly urges the cam follower 150 against the cam 144 with force that is sufficient to move the cam 144 angularly and bring the follower 150 into the bottom of the depression 148 if the follower is on one of the sloping sides of the depression.

The double crank 146 has pins 157 near its opposite ends. These pins engage in slots 160 in the lower forward walls of the magazines so that as the crank 146 moves angularly about the axis of the shaft 142, the pins 157 shift the magazines toward the right or left in Fig. 9, depending upon the direction of rotation of the shaft 142.

The length of each arm of the crank 146, from the axis of the shaft 142 to the crank pin 157, is equal to the spacing between the slots 160 so that with each half revolution of the cam 144, one of the crank pins 157 will shift the magazines for a distance equal to the spacing between the slots 160, and the other crank pin 157 will move into position to engage the next slot 160. One complete revolution of the shaft 142, therefore, moves one magazine out of operative position and shifts the next magazine into alignment with the guideways 143 of the projector.

Considering next the interferences for preventing the shaft 142 from being turned at the wrong time, there is an interference block 164 rigidly connected with a shaft 165 extending through bearings on a fixed part of the frame. The block 164 and the shaft move angularly as a unit about the axis of the shaft. A spring 167 urges the block 164 into the position shown in Fig. 9, and when the block 164 is in this position, it comes against the lower side of the cam follower 150 and prevents the cam follower from moving downward. This prevents the cam 144 from turning in either direction, because the cam cannot turn unless it can displace the cam follower 150 from the depression 148.

The block 164 can be rocked about the axis of the shaft 165, and out of the way from the cam follower 150, by a knob 169 on the end of a stud extending through an arcuate slot 170 in the front wall of the apparatus. There is a bar 172 at the right hand side of the block 164, however, which locks the block against pivotal movement unless the slide holder carrier is in predetermined position.

The bar 172, and the mechanism that operates it, is best illustrated in Fig. 8. This bar 172 is supported on brackets 175 which permit longitudinal sliding movement of the bar in response to the rocking of a lever 176 about its supporting pin 177. A pin 178 extending from the bar 172 projects through a slot 179 in the lower end of the lever 176. A similar pin 181 projects from a crank arm 182 through a slot 183 near the upper end of the lever 176.

The crank arm 182 is secured to the shaft 60 of the slide holder carrier arms 138 so that angular movement of the slide holder carrier arms 138 about the axis of the shaft 60 causes angular movement of the crank 182 and rocks the lever 176 to move the bar 172 into and out of the position that locks the block 164. The parts are so correlated that the bar 172 is withdrawn from its interfering position with respect to the block 164 only after the slide holder carrier arms 138 have moved upward far enough to discharge a slide holder at the projection station of the apparatus. This feature prevents a slide holder magazine from being moved away while one of its slides is out of the magazine and on the carrier.

The invention also includes the feature of preventing movement of the slide holder magazines while there is a slide holder at the projection station. This feature is obtained by having pushers 186 located behind the projection station and movable toward the right in Fig. 8, to push a slide holder 37 off the registration pins or supports 36.

The pushers 186 are connected to a plate 187 that has a bracket 188 connected to its rearward end and made with a slot that is engaged by a pin 190 of a bell crank 191. The bell crank 191 is rocked about a pivot 192 by a link 193 which extends upward from a crank 194. This crank 194 is secured to the rearward end of the pivot shaft 165 to which the block 164 is rigidly connected.

Whenever the block 164 is rocked about the axis of the shaft 165, it turns the shaft 165 and the crank 194 and pulls the link 193 downward to operate the bell crank 191 and pushers 186 so that any slide holder at the projection station will be pushed off the registration pins or supports 36, and slide down the guideways 143 into its magazine 121 before the magazine is shifted out of alignment with the guideways 143.

The preferred embodiments of the invention have been described but other modifications can be made and some features can be used alone or in different combinations without departing from the invention as described in the claims.

I claim as my invention:

1. A slide projector including a projection station, a magazine comprising a downwardly sloping guideway along which slide holders slide, a slide holder carrier comprising arms with hooks thereon for engaging the lowermost slide holder of the magazine as the arms swing upwardly toward the projection station, a pusher that lifts the lowermost slide holder from the guideway into the path of the hooks.

2. A slide projector including a projection station, a magazine having a downwardly sloping guideway on which the slide holders are supported, means holding the magazine in a predetermined position with respect to the projection station, a stop at the lower end of the guideway with which the lowermost slide holder in the magazine contacts, a slide holder carrier with hooks that move past a region near the lower end of the magazine as the slide holder carrier moves back and forth between the projection station and a lowered position, a pusher that lifts the lowermost slide holder from the guide and into the path of the slide holder carrier, and common actuating means that operate said pusher and the slide holder carrier in timed relation with one another.

3. A slide projector comprising a station at which successive slides are held during projection, a magazine including a downwardly sloping guideway by which a group of slide holders are supported, a stop located at the end of the guideway and with which the lowermost slide holder contacts, a slide holder carrier for taking slides from the magazine to the station in which they are projected, said carrier including arms with hooks on the arms that travel past the lower end of the magazine during movement of the carrier, a pusher located under the lowermost slide in the magazine, an operating lever that raises the pusher to elevate the lowermost slide holder into the path of the hooks of said carrier, different cam means that operate the arms and the pusher, respectively, in timed relation with one another, and common operating mechanism for the cam means.

4. A slide projector comprising a projection station, a slide holder magazine, apparatus for moving a slide holder from one end of the magazine to the projection station in two stages, said apparatus including a lifting device that raises the upper portion of the endmost slide holder in the magazine above the other slide holders immediately ahead of it for its first stage of movement to the projection station, and said apparatus including also a slide holder carrier that moves independently of the lifting device and between the location of the raised endmost slide holder and the projection station to impart the second stage of movement to the slide holder, and a common cam that operates both the slide holder carrier and the lifting device in timed relation with each other.
fffoo--outerletaoin 5. A slide projector comprising a projection station, a magazine that holds a plurality of slide holders, a slide holder carrier that moves the endmost slide from the magazine to the projection station, a lifting device that projects the endmost slide part way out of the magazine and into the path of the slide holder carrier, supporting pins at the projection station for supporting each successive slide holder that the carrier brings to the projecting station, bearing means on which the supporting pins are movable into position to release a slide holder from the projection station, and a common cam that operates the slide holder carrier, the lifting device, and the supporting pins in timed relation with one another.

6. A slide projector including a slide holder magazine that comprises a sloping guideway along which slide holders are moved by gravity, a stop located at the lower end of the guideway and with which the lowermost slide holder contacts, a projection station above the upper end of the guideway, an aperture plate at the projection station inclined downwardly at a steeper angle than the guideway of the magazine for causing the slide holders to move quickly away from the projection station when released, supporting pins on which the slide holder rests while at the projection station, a positioning abutment at the projection station, means that urge one edge of the slide holder at the projection station into contact with the abutment to align the slide holder with an aperture of said aperture plate, a slide holder carrier that moves the lowermost slide from the magazine to the projection station, a lifting device under the lowermost slide holder in the magazine, mechanism that operates the lifting device to push the lowermost slide holder partway out of the magazine and into the path of the slide holder carrier in timed relation with the operation of said carrier, and mechanism that withdraws the supporting pins at the registration station in timed relation with the operation of the slide holder carrier as said carrier brings another slide to the registration station.

7. A slide projector comprising a projection station, supporting means at the projection station on which successive slide holders rest with a slide in the holder in the focal plane of the projector, a magazine that holds a plurality of slide holders, a slide holder carrier that moves slides from one end of the magazine to the projection station, said slide holder carrier including hooks from which the slide holders hang and arms that support the hooks and on which the hooks have limited pivotal movement, extending portions of the hooks located adjacent to the upper parts of the carrier arms, and springs, on both sides of the extending portions of the hooks, holding the hooks in a neutral position, the springs on one side of the extending portions yielding during pivotal movement of the hooks in one direction from their neutral position and the springs on the other side yielding during pivotal movement of the hooks in the other direction from their neutral position.

8. A slide projector comprising a magazine, a projection station to which slide holders are brought successively for projection of the slides contained in said holders, a slide holder carrier including arms with hook elements that are connected to the upper portions of the arms and that are movable with respect to the arms, spring means holding the hook elements in a neutral position, said spring means being yieldable in both directions from the neutral position, and guide means for the hook elements that hold the hook elements on opposite sides of their neutral position at successive times during the movement of the slide holder carrier through a cycle.

9. A slide projector comprising a projection station, a magazine for a plurality of slide holders, a slide holder carrier that moves the endmost slide from the magazine to the projection station, said slide holder carrier including arms and hooks movably connected to the arms by spring means that hold the hooks in a neutral position, said spring means being yieldable in opposite directions during movement of the hooks to opposite sides of their neutral position, a cam located along the path of movement of the hooks, and cam followers connected with the hooks in position to engage the cam, said cam having an upper surface that controls the path of movement of the hooks during advancing movement of the slide holder carrier and a lower surface that guides the movement of the hooks during retreating movement of the carrier.

10. A slide projector comprising a projection station having a surface with which a slide holder contacts when its slide is in the focal plane of the projector, a magazine for slide holders, a slide holder carrier that moves successive slides from the magazine to the projection station, supports on which each slide holder rests at the projection station, bearings on which the supports are movable with respect to said surface with which the slide holder contacts and in directions to urge a slide holder toward and from said surface, and mechanism that moves said supports in a direction to urge a slide holder toward said surface in timed sequence with the placing of each slide holder on the supports to insure contact of the slide holder with said surface and resulting uniform focus of the projector.

11. A slide projector comprising a projection station having a surface with which a slide holder contacts when its slide is in the focal plane of the projector, a magazine for slide holders, a slide holder carrier movable back and forth through a stroke to deliver successive slides from the magazine to the projection station, registration supports at the projection station at locations for receiving each successive slide holder from the slide holder carrier, mechanism that moves the registration supports outwardly to receive a slide holder from the carrier, then inwardly for a limited distance to insure contact of the slide holder with said surface at the projection station, and then inwardly beyond a supporting position to drop the slide holder from the projection station.

12. A slide projector comprising a projection station, a slide holder carrier that brings successive slides to the projection station, a sloping guideway down which each holder slides when discharged from the projection station, a magazine at the lower end of the guideway for receiving each holder that slides down the guideway, the magazine including a sloping guideway similar to that leading from the projection station, a support on which said magazine is movable into and out of an operating position that locates the slides in position for successive pick-up by the slide holder carrier, releasable means for holding the magazine in said operative position, the sloping guideway of the magazine being located in position to form a continuation of the sloping guideway from the projection station when the magazine is in said operative position for cooperation with the slide holder carrier.

13. A slide projector comprising a projection station, a slide holder carrier that brings successive slide holders to the projection station, a guideway relatively fixed with respect to the projection station and sloping downwardly from the projection station, and along which each holder slides when released from the projection station, a magazine at the lower end of the guideway for receiving holders that slide down the guideway, said magazine comprising a plurality of different compartments movable transversely of the direction in which the relatively fixed sloping guideway extends, each of said compartments having a sloping guideway that constitutes a continuation of the relatively fixed guideway when the compartment is moved into a position in alignment with the relatively fixed guideway, a support on which the magazine is movable to bring the different compartments selectively into alignment with the fixed guideway, and mechanism for shifting the magazine on said support.

14. The slide projector described in claim 13 with resilient means that urge each compartment into alignment with the relatively fixed guideway when the magazine is brought into a position that locates any one of the compartments close to a position of alignment with the fixed guideway.

15. A slide projector including a projection station, a guideway sloping downwardly from the projection station and along which slide holders move by gravity when released from the projection station, a magazine for slide holders located at the lower end of the sloping guideway and movable into and out of a position of alignment with the sloping guideway so that different magazines can be used with the projector, a slide holder carrier that moves into one position where it picks up successive slide holders from the magazine and that moves into another position where it deposits the successive slide holders at the projection station, releasable holding means that maintain the magazine in alignment with the guideway, and an interference that prevents the release of said holding means while the slide holder carrier is located between its pick-up and deposit positions.

16. A slide projector comprising a projection station, supporting means that hold a slide holder in position at the projection station, mechanism that periodically releases the supporting means and discharges the slide from the projection station, a guideway extending downwardly from the projection station and along which the slide holder moves when released from the projection station, a magazine at the lower end of the guideway in a position of alignment with the guideway to receive the slide holder, said magazine being movable into and out of alignment with the guideway, releasable means holding the magazine in alignment with the guideway, an interference that prevents release of said releasable means, and operative connections between the interference and the mechanism that operates the slide holder supporting means, said connections being moved cyclically by said mechanism to shift the interference into inoperative position during the time that the slide holder supporting means are in position to release a slide holder from the projection station.

17. A slide holder projector including a projection station, supporting means at the projection station to hold a slide holder in position for projection, mechanism that periodically withdraws the supporting means to release the slide holder, a guideway extending downwardly from the projection station and along which the slide holder moves when released from the projection station, a multi-compartment magazine movable transversely of the direction in which the guideway extends for bringing the different compartments of the magazine selectively into positions of alignment with the guideway, a manually-operated device that moves the magazine transversely, a lock that prevents operation of said manually-operated device, and motion transmitting connections that are operated by the mechanism which releases the slide holder supporting means and that release the lock whenever the slide holder supporting means are in position to release a slide holder.

18. A slide holder projector comprising a projection station, a multi-compartment magazine, a slide holder carrier that successively transfers the endmost slide of the magazine to the projection station, a support along which the magazine is movable to bring different compartments into operative position with respect to the slide holder carrier, a manually-actuated device for moving the magazine along said support, a lock that prevents operation of the manually-actuated device, and a connection between the slide holder carrier and the lock which holds the lock in operative position while the slide holder carrier is operating to transfer the slide holder to the projection station.

19. A slide holder projector including a projection station, supporting means at the projection station to hold a slide holder in position for projection, mechanism that periodically withdraws the supporting means to release the slide holder, a guideway extending downwardly from the projection station and along which the slide holder moves when released from the projection station, a multi-compartment magazine movable transversely of the direction in which the guideway extends for bringing the different compartments of the magazine selectively into positions of alignment with the guideway, a slide holder carrier that operates to transfer to the projection station the lowermost slide of the magazine compartment which is in alignment with the guideway, a support along which the magazine moves to bring different compartments selectively into alignment with the guideway, a manually-actuated device that moves the magazine along said support, locking means that prevent the operation of the manually-actuated device, and connections between the locking means and both the slide holder carrier and the mechanism that releases the slide holder supporting means at the projection station, said connections being operative to release the locking means only when the slide holder supporting means at the projection station is in position to release a slide holder, and the slide holder carrier is in a predetermined position beyond those positions through which it operates while transferring a slide holder to the projection station.

References Cited in the file of this patent

UNITED STATES PATENTS

| Number | Name | Date |
|---|---|---|
| 1,153,685 | Guerzoni et al. | Sept. 14, 1915 |
| 1,203,744 | Johnson | Nov. 7, 1916 |
| 1,402,791 | Petherick | Jan. 10, 1922 |
| 1,428,347 | Van Altena | Sept. 5, 1922 |
| 1,522,284 | Chamberlain | Jan. 6, 1925 |
| 1,611,843 | Van Altena | Dec. 21, 1926 |
| 2,174,778 | Croft | Oct. 3, 1939 |
| 2,213,779 | Young | Sept. 3, 1940 |
| 2,265,992 | Beck | Dec. 16, 1941 |
| 2,341,098 | Hansen | Feb. 8, 1944 |
| 2,559,858 | Elle et al. | July 10, 1951 |